R. H. RICHARDS & E. P. HUEBER.
SHINGLE SAWING MACHINE.
APPLICATION FILED JAN. 28, 1911. RENEWED FEB. 3, 1913.
1,055,945.
Patented Mar. 11, 1913.
3 SHEETS—SHEET 1.
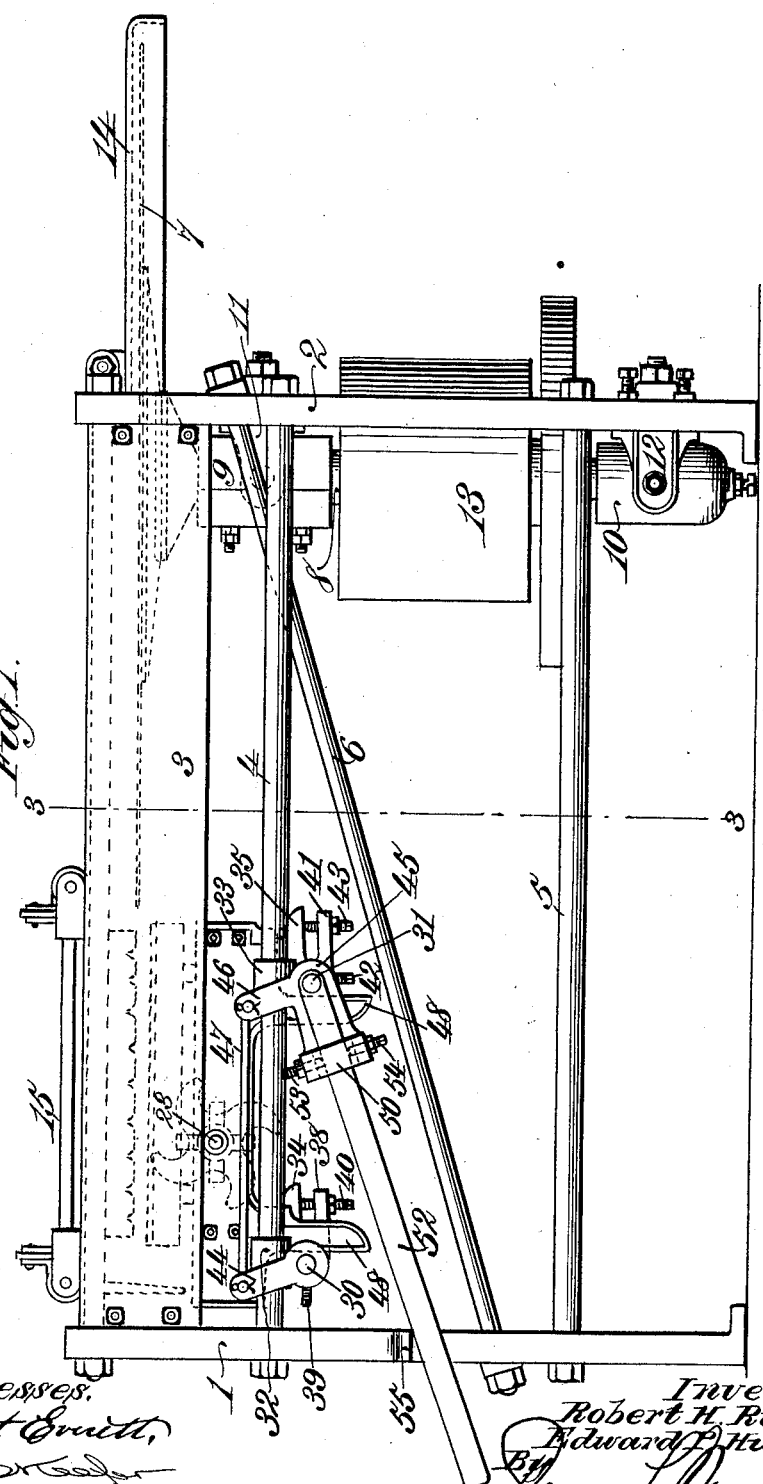

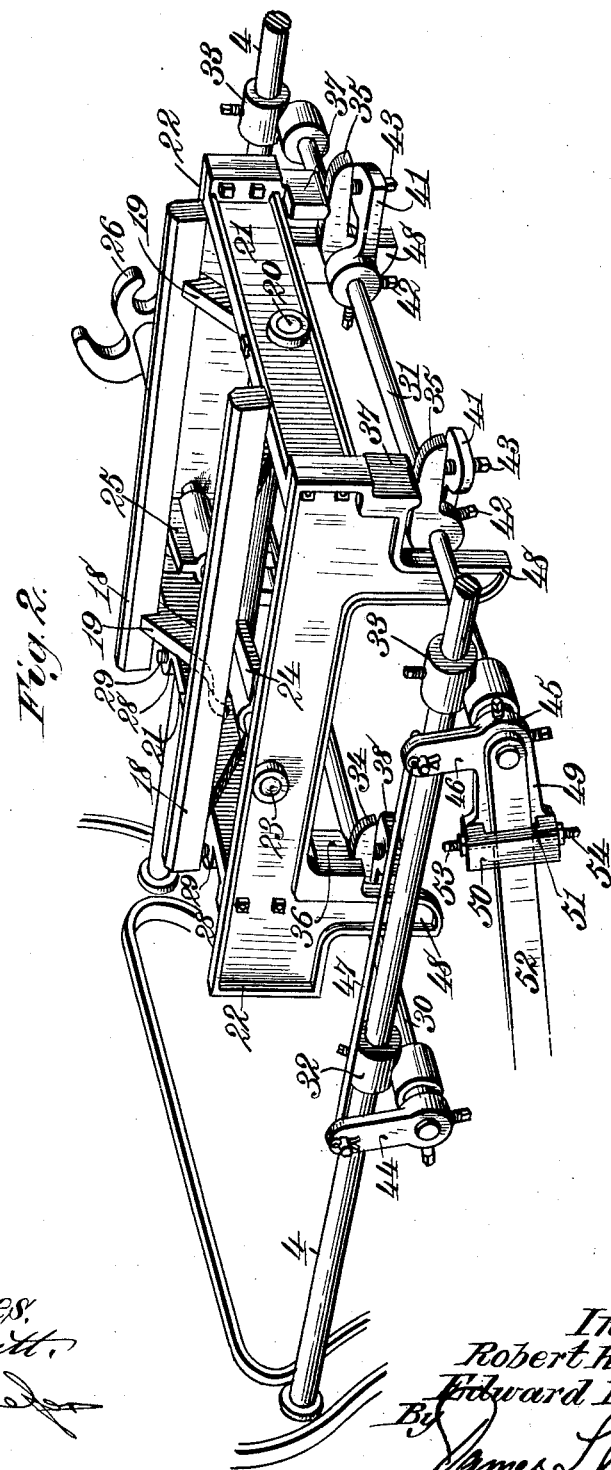

R. H. RICHARDS & E. P. HUEBER.
SHINGLE SAWING MACHINE.
APPLICATION FILED JAN. 28, 1911. RENEWED FEB. 3, 1913.
1,055,945.
Patented Mar. 11, 1913.
3 SHEETS—SHEET 3.
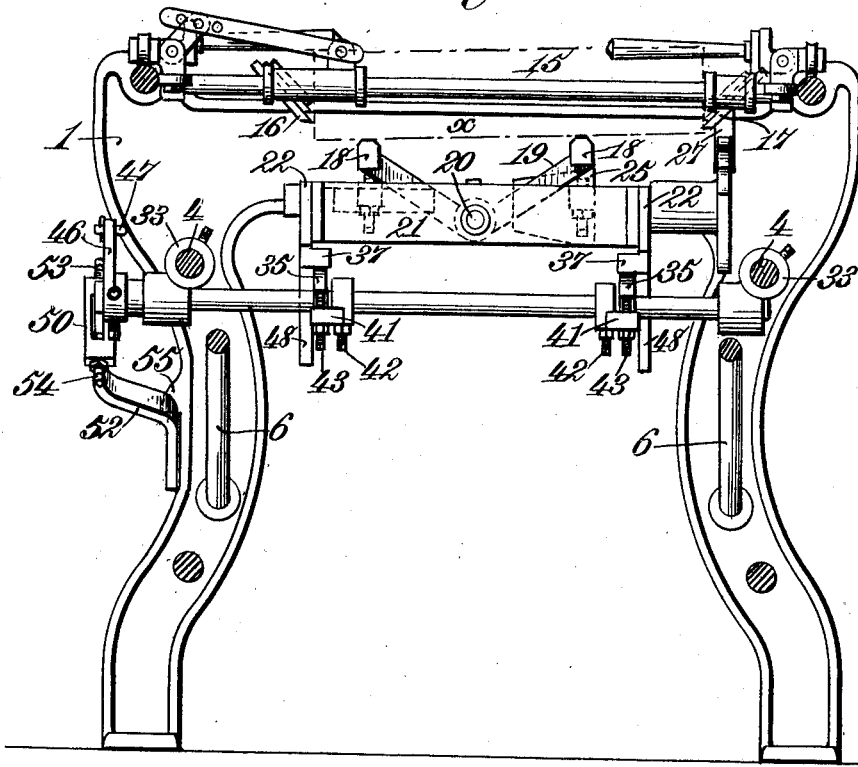
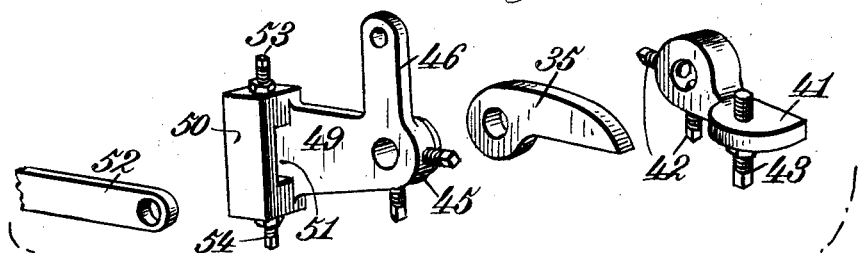

UNITED STATES PATENT OFFICE.

ROBERT H. RICHARDS AND EDWARD P. HUEBER, OF HACKETTSTOWN, NEW JERSEY, ASSIGNORS TO AMERICAN SAW MILL MACHINERY COMPANY, OF HACKETTSTOWN, NEW JERSEY, A CORPORATION OF NEW JERSEY.

SHINGLE-SAWING MACHINE.

1,055,945. Specification of Letters Patent. Patented Mar. 11, 1913.

Application filed January 28, 1911, Serial No. 605,270. Renewed February 3, 1913. Serial No. 746,053.

*To all whom it may concern:*

Be it known that we, ROBERT H. RICHARDS and EDWARD P. HUEBER, citizens of the United States, residing at Hackettstown, in the county of Warren and State of New Jersey, have invented new and useful Improvements in Shingle-Sawing Machines, of which the following is a specification.

The present invention relates to improvements in shingle sawing machines of the type wherein the shingle bolt is positioned for each cut by a cradle which is usually tiltable and the bolt after being positioned is advanced to the saw by a carriage, and the primary object of the present invention is to provide improved means for supporting and adjusting the elevation of the cradle whereby the cradle may be finely adjusted to gage the cuts of different desired depths and the cradle may be quickly adjusted to enable knots or defective portions of the bolt to be removed by the saw and after such defective portions have been removed, the cradle may be immediately returned to its previous position without disturbing the fine adjustment.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a side elevation of a shingle sawing machine constructed in accordance with the preferred embodiment of the invention; Fig. 2 is a perspective view of that portion of the machine including the cradle and the mechanism for supporting and adjusting the elevation thereof; Fig. 3 represents a transverse section of the machine on the line 3—3 of Fig. 1 and looking toward the left; and Fig. 4 is a collective view of certain parts included in the cradle-adjusting mechanism.

Similar parts are designated by the same reference characters in the several views.

In the present instance we have shown the improvements applied to a shingle sawing machine of a conventional form, it embodying a frame having end pieces 1 and 2 which are rigidly connected by a suitable number of horizontal and longitudinally extending bars 3, 4 and 5, and a diagonal bar or brace 6 is used to afford additional rigidity. The saw 7 which is of a suitable size and is revoluble in a horizontal plane is mounted on an arbor 8 journaled in upper and lower bearings 9 and 10, these bearings being preferably swiveled in brackets 11 and 12 suitably bolted to the end section 2 of the frame. The saw is driven by a belt pulley 13 or its equivalent and that portion of the saw which projects outwardly beyond the end section 2 of the frame is preferably protected by a projecting guard 14.

The bolt from which the shingles are to be sawed is advanced or fed to the saw by a carriage 15 of suitable form, the carriage in the present instance having opposed grippers 16 and 17 adapted to coöperate with the ends of the bolt $x$ in the usual manner common to shingle sawing machines of this class.

The cradle according to the present invention embodies a pair of longitudinally extending rails 18 which are rigidly connected by brackets 19, and these brackets are fixed to a rock shaft 20. The rock shaft 20 is journaled in the end sections 21 of a cradle frame, the cradle frame also embodying side sections 22 which are bolted or otherwise rigidly connected to the end sections 21, and the cradle and its frame are bodily adjustable vertically by mechanism that will be hereinafter more fully described. In shingle sawing machines of this class, the bolt upon being returned by the carriage after a cut has been made therefrom, is released from the carriage and drops upon the rails 18 which position the bolt properly for the next cut. Preferably the cradle is supported alternately at reverse inclinations for the successive cuts and to accomplish this result, a shaft 23 is revolubly journaled in the side sections 22 of the cradle frame and is provided with a pair of cams 24 and 25, these cams being bladed and the blades are arranged in right angular relation whereby one cam will engage the under side of one rail 18 and elevate this particular side of the cradle, while the other cam will permit descent of the opposite side of the cradle, and vice versa. In shingle sawing machines of this class, it is usual to provide these cams and to operate them at appropriate intervals from the carriage by a star wheel 26 which is mounted on the shaft 23 and a dog 27 which is movable with the carriage and engages the star wheel 26 to turn it step-by-step upon each return movement of the carriage. In some cases it may be desirable to lock the cradle in fixed position in which case the end sections 21 of the cradle frame may be provided with lugs 28 in which are tapped set-screws 29 which coöperate with the rails 18 and thereby prevent tilting of the cradle, it being understood that when the cradle is locked in this manner, the dog 27 will be swung into an inoperative position.

According to the present invention, the cradle and its frame are supported and adjusted by a pair of transverse rock shafts 30 and 31, these rock shafts being arranged in the same horizontal plane and one behind the other and they are rotatably supported upon the side bars 4 of the frame by pairs of bearing brackets 32 and 33, these brackets being held in proper position with respect to the length of the side bars 4 by set-screws, as shown, or their equivalents. The shaft 30 is provided with a pair of lifting dogs 34 while the shaft 31 is provided with a similar pair of lifting dogs 35. These dogs are loosely or rotatably mounted upon their respective shafts. The lifting dogs 34 on the shaft 30 are preferably convexed or formed with cam surfaces upon their upper sides and such surfaces coöperate with the projections 36 formed by the cradle frame, while the lifting dogs 35 on the shaft 31 are similarly formed and coöperate with the projections 37 which are formed toward the opposite end of the cradle frame, the cradle frame being thereby supported at substantially its four corners. The shaft 30 is also provided with a pair of actuating arms 38 which are clamped or otherwise secured in fixed position thereon by the set-screws 39 or equivalent means, and each of these actuating arms carries a set-screw 40 which is tapped therein and bears against the under side of the corresponding lifting dog or pawl 34 and thereby supports the latter in proper position. The shaft 31 is provided with a pair of similar actuating arms 41 which are also clamped in fixed position thereon by the set-screws 42 or equivalent means, and these actuating arms 41 are provided with set-screws 43 which rest against the under sides of the respective lifting dogs or pawls 35 and thereby support the latter in proper position.

The shafts 30 and 31 are operatively connected so as to rotate in unison when a fine adjustment of the cradle is made or when the elevation of the cradle is temporarily changed to remove a defective portion of the bolt or for a similar purpose. To accomplish this result, one end of the shaft 30 is provided with a crank 44 while the corresponding end of the shaft 31 is provided with a bracket 45 which has a crank arm 46 thereon. The crank 44 and the crank arm 46 are connected to rotate in unison by a link 47, it being understood that the crank 44 and the bracket 45 are secured by set-screws or equivalent means to the respective shafts.

According to the present invention, the cradle supporting frame is guided in its vertical movement and lateral displacement thereof is prevented by a set of vertical guides 48 which are arranged in pairs having parallel vertical faces, the vertical faces of two of these guides bearing against the shaft 30 to prevent rearward displacement of the frame while the vertical faces of the remaining two guides bear against the shaft 31 to prevent forward displacement of the cradle frame, these guides being preferably arranged to engage the inner sides of these two transverse shafts. Lateral displacement of the cradle frame is prevented by the engagement of these vertical guides 48 with the outer sides of the lifting dogs or pawls 34 and 35.

According to the present invention, the bracket 45 not only serves as part of the means for insuring simultaneous adjustment of the two shafts, but it forms part of the means for adjusting and setting the cradle at the different desired elevations and for temporarily altering the elevation of the cradle, as hereinbefore mentioned. For this purpose, the bracket 45 has an arm 49 which is provided toward its end with a head 50 having a slot 51 through which an adjusting lever 52 projects, the slot 51 being of a size to permit adjustment of the lever 52 therein. One end of the lever is rotatably engaged on the outer end of the shaft 31 as a fulcrum, and a pair of opposed set-screws 53 and 54 are tapped into the opposite sides of the head 50; they extend into the slot 51, and they engage the opposite edges of the lever 52. By unscrewing one of these set-screws and screwing up the other, the angular relation between the lever 52 and the arm 49 of the bracket which is fixed to the shaft 31 may be altered. One side of the end section 1 of the frame is formed with a lug 55 which constitutes a lock to normally hold the lever 52 in a predetermined angular position and the lever 52 occupies this position during the normal operation of the machine.

In operating a shingle sawing machine embodying the improvements provided by the present invention, the lever 52 is engaged beneath the lug 55 on the frame and the elevation of the cradle is adjusted by appropriate manipulation of the set-screws 53 and 54, the lever 52 during this adjustment remaining stationary and the weight of the cradle and the cradle frame will be sufficient to hold the lever 52 in engagement with the under side of the locking lug 55. The adjustment just noted will determine the depth of cut and this adjustment remains fixed during the operation of the machine which is similar to that of shingle sawing machines of this class. When it is desirable or necessary to remove a defective portion of the bolt, the lever 52 may be disengaged from the locking lug 55 and caused to rise to such a point where the saw will properly remove the defective portion of the bolt when the latter is advanced to the saw by the carriage and when such defective portion of the bolt has been removed, the lever 52 is restored to its normal position with respect to the lug 55 and the usual operation of the machine may be resumed as the fine adjustment which determines the depth of cut has not been disturbed.

What is claimed is:—

1. In a shingle sawing machine, the combination of a saw, a carriage for feeding the material thereto, and means for positioning the material relatively to the carriage embodying a cradle and cradle frame, a pair of transverse rock shafts arranged in the same horizontal plane, a set of lifting dogs operatively connected to said shafts and coöperative with the cradle frame to elevate and lower the latter and the cradle, vertical guides on the cradle frame coöperative with opposite sides of said rock shafts, and an operative connection between said shafts for causing unitary rotation thereof.

2. In a shingle sawing machine, the combination of a saw, a carriage for feeding the material thereto, and means for positioning the material relatively to the carriage comprising a cradle and cradle frame, a pair of rock shafts arranged in the same horizontal plane and provided with devices coöperative with the cradle frame for elevating and lowering the latter and the cradle, and vertical guides formed on the cradle frame and coöperative with said shafts to insure movement of the cradle frame in a vertical direction only.

3. In a shingle sawing machine, the combination of a saw, a carriage for feeding the material thereto, and means for positioning material relatively to the carriage comprising a cradle and cradle frame, a pair of parallel rock shafts arranged in the same horizontal plane and provided with devices coöperative with the cradle frame for elevating and lowering it, and vertical guides formed on the cradle frame and coöperating with the inner sides of said shafts for guiding the cradle frame during its vertical movements and preventing lateral displacement thereof.

4. In a shingle sawing machine, the combination of a saw, a carriage for feeding the material thereto, and means for positioning the material relatively to the carriage comprising a cradle and cradle frame, a pair of operatively connected and parallel rock shafts arranged in the same horizontal plane and provided with lifting dogs coöperative with the cradle frame, and vertical guides formed on the cradle frame and coöperating with the respective rock shafts to prevent lateral displacement of the cradle frame in one direction, and said guides being also coöperative with said lifting dogs to prevent lateral displacement of the cradle frame in another direction.

5. In a shingle sawing machine, the combination of a saw, a carriage for feeding material thereto, and means for positioning the material relatively to the carriage embodying a cradle and cradle frame, a pair of operatively connected rock shafts, a set of lifting dogs rotatably mounted on the respective rock shafts and coöperative with the cradle frame to support and adjust it, actuating arms fixed to the respective rock shafts, means on the cradle frame coöperative with said dogs to retain them in coöperative relation with their respective actuating arms, and means adjustably connecting said actuating arms to the respective lifting dogs.

6. In a shingle sawing machine, the combination of a saw, a carriage for feeding material thereto, a cradle and cradle frame, a pair of operatively connected parallel rock shafts arranged in the same horizontal plane, a set of lifting dogs rotatably arranged on the rock shafts and supporting the cradle frame, a corresponding set of actuating arms fixed to the respective rock shafts, set-screws carried by the actuating arms and coöperative with the lifting dogs to properly position and actuate the latter, and guides on the cradle frame coöperative with opposite sides of said rock shafts and also with said dogs to prevent lateral displacement of the cradle frame.

7. In a shingle sawing machine, the combination of a saw, a carriage for feeding material thereto, a cradle and cradle frame, a pair of parallel operatively connected rock shafts both arranged in the same horizontal plane, a pair of lifting dogs rotatably mounted on each rock shaft and coöperating with and supporting the respective ends of the cradle frame, a corresponding pair of actuating arms fixed to each rock shaft and having adjustable means thereon which engage the respective lifting dogs, and vertical guides formed on the cradle frame and engaging the inner sides of the rock shafts and the outer sides of the lifting dogs to prevent lateral displacement of the cradle frame and to retain said dogs in coöperative relation with their respective actuating arms.

In testimony whereof we have hereunto set our hands in presence of two subscribing witnesses.

ROBERT H. RICHARDS.
EDWARD P. HUEBER.

Witnesses:
M. L. FLETCHER,
ROBT. A. COLE.

Copies of this patent may be obtained for five cents each, by addressing the "Commissioner of Patents, Washington, D. C."